Dec. 17, 1968    J. SPITERI    3,416,553

RELIEF VALVE

Filed Oct. 30, 1964

INVENTOR.
JOSEPH SPITERI
BY
Charles L. Lovercheck
attorney

United States Patent Office 3,416,553
Patented Dec. 17, 1968

3,416,553
RELIEF VALVE
Joseph Spiteri, 142 W. 26th St.,
Erie, Pa. 16508
Filed Oct. 30, 1964, Ser. No. 407,824
5 Claims. (Cl. 137—115)

ABSTRACT OF THE DISCLOSURE

The valve disclosed herein is suitable to be connected in the fluid line so that the fluid line will be connected to a bypass when the pressure exceeds a certain value. The valve is made on a Wheatstone bridge principle and in one embodiment of the invention, two pistons having different areas are each subjected to the pressure of the fluid in the line. The piston having the larger area acts in opposition to the force from a spring, thus when the total force on the large piston exceeds the sum of the force on the small piston and the spring, the valve will be moved to a position where bypass is connected to the flow stream. Throttling members are provided in the legs in the valve to vary the flow.

---

This invention relates to valves and more particularly to precision controlled valves. The valve disclosed herein is actuated by differential forces between the fluid flowing from the inlet to the outlet through two separate channels which counterbalance each other to a degree that the net force becomes sufficient to actuate the valve at a predetermined pressure of the fluid through the valve.

The invention has for an object a simple and inexpensive bridge network of fluid passages to control actuation of the valve by counterbalancing the pressure and/or force in two separate passages through the valve. This counterbalance brings about a state of equilibrium and provides the valve with a fulcrum point of control.

Another object of the invention is to provide an improved valve.

Another object of the invention is to provide a valve wherein an actuating piston is disposed between two separate flow passages wherein a different resistance to fluid flow is encountered by fluid in each of the passages and wherein the net force of the fluid in the two passages exerts a differential force on the valve member to actuate the valve at a predetermined pressure fluid flowing into the valve.

Another object of the invention is to provide an improved plug-type valve.

Another object of the invention is to provide a valve wherein the principles encountered in the electronic art in the well known Wheatstone bridge are utilized in a valve to actuate the valve.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
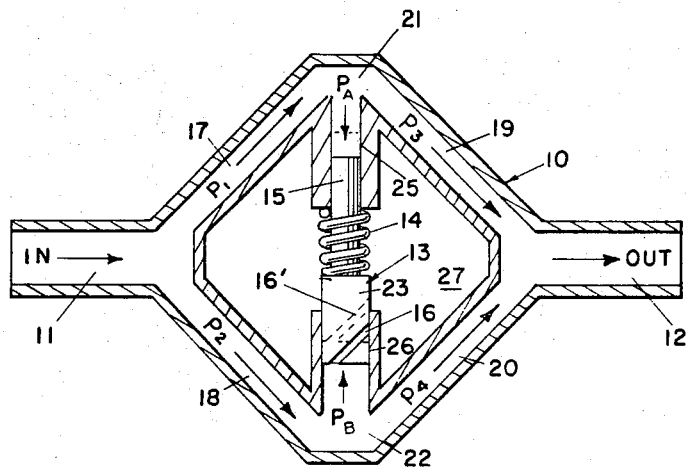
FIG. 1 is a longitudinal cross-sectional view of a valve according to the invention.

Now with more particular reference to the drawings, the valve shown in FIG. 1 has a body 10 with an inlet port 11 and an outlet port 12 through which fluid may flow.

The valve body has two parallel passages which connect the inlet 11 to the outlet 12. The first of these passages is made up of a first channel made up of the inlet leg 17 and outlet leg 19 connected together at the juncture 21 with unit pressure indicated at $P_A$. The second channel is made up of the inlet leg 18 and the outlet leg 20 connected in series between the inlet 11 and the outlet 12 and connected together at the juncture 22 with unit pressure at this point indicated at $P_B$.

A piston 13 is supported between the junctures 21 and 22 and the piston has a large cylindrical end 23 and a small cylindrical end portion 15. The end surfaces of end portions 15 and 23 are exposed to the pressures $P_A$ and $P_B$ at the junctures 21 and 22 respectively when fluid is flowing through the valve body.

The end portions 15 and 23 are received in cylinder barrels 25 and 26 and the pistons make sliding engagement therewith. A compression spring 14 is supported between the shoulder formed at the juncture of end portion 23 with end portion 15 and rests on the shoulder formed by the ends of the cylindrical portion that defines barrel 25.

The flow legs 17, 18, 19, and 20 may each be of a different size so that a different flow resistance is exerted on the fluid in each of these legs thereby providing a net difference in pressure between $P_A$ and $P_B$ times the respective piston areas which they engage and therefore providing an actuating force. Both ends of the piston could have the same area or the end at $P_B$ could be larger than the end at $P_A$ as indicated. It will be noted that the piston is urged upwardly in FIG. 1 by the total force $P_B$ times the area of the end of end portion 23. This force is counterbalanced by the sum of the force of spring 14 plus the total force exerted by $P_A$ times the end area of end 15 when the force $P_B$ times the end area of end 23 becomes greater than the opposing force. The piston 13 will move upward and the pressure relief opening 16 will be moved to the dotted line position 16' and will connect the fluid at the juncture 22 with the auxiliary flow passage 27.

If we view this from a physicist's perspective, we would visualize the Wheatstone bridge equation, i.e., P1 resistance divided by P2 resistance equals P3 resistance divided by P4 resistance. This will result in a very small size spring control and very high pressure.

Figure 2:
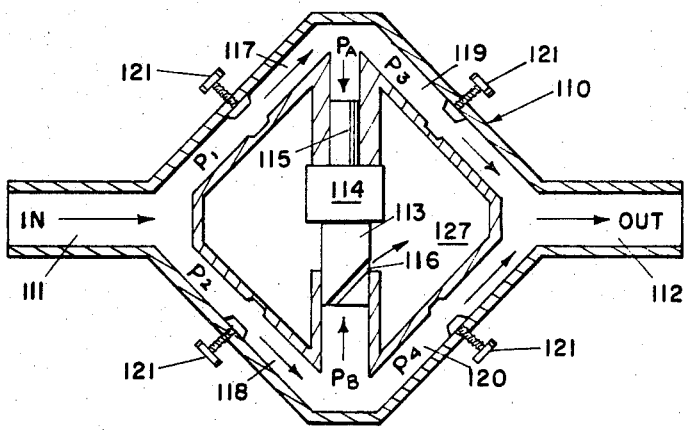
FIG. 2 is a valve similar to the valve shown in FIG. 1 wherein an electrical solenoid is substituted for a spring in the embodiment of the invention shown in FIG. 1.

In the embodiment of the invention shown in FIG. 2, the number 100 has been added to each index numeral corresponding to the numeral for the corresponding part of FIG. 1.

In FIG. 2 the solenoid 114 has been added instead of the spring 14 in FIG. 1. Thus the solenoid is inductively wound about the center of end 115. When the current in the solenoid is increased the piston 113 is urged upwardly.

The manner in which the solenoid 114 can be installed will be obvious to those skilled in the art from a view of the drawing and a general knowledge of electromagnetic circuits.

Screw plugs 227 are added to the flow legs 117, 118, 119, and 120, which act as throttling valves. Thus, the resistance to flow in each leg can be adjusted to a different flow resistance. Thus, a predetermined pressure drop can be obtained in each of these legs thereby providing a net difference in pressure between $P_A$ and $P_B$.

Applicant has disclosed in the two foregoing embodiments valves which operate on the principle of a Wheatstone bridge and are therefore very sensitive to changes in pressure of fluid flowing therethrough.

Figure 3:
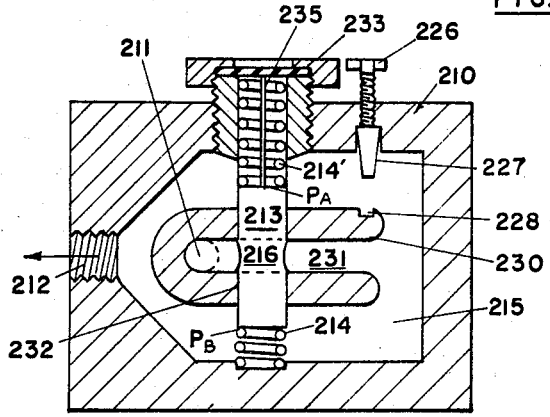
FIG. 3 is a longitudinal cross-sectional view of a plug valve according to the invention.
Figure 4:
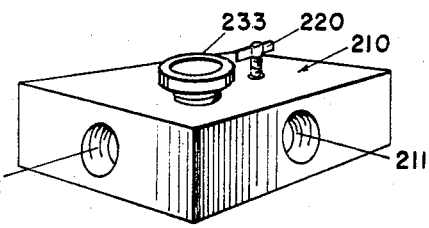
FIG. 4 is an isometric view of the plug valve shown in FIG. 3.

In the embodiment of the invention shown in FIGS. 3 and 4, a valve is shown similar in principle to that shown in the embodiment of FIGS. 1 and 2, having a body 210 with an inlet opening 211 and an outlet opening 212. The body 210 is generally hollow and has the partition 230 which has the elongated passage 231 connecting the chamber 215 with the inlet 211. It will be noted that the cylinder 213 is supported in a bore 232 in the partition 230 and is slidable therein. The piston has a port 216 in the form of an opening through the piston 213 through which fluid can flow from the passage 231 to the outlet 212 when the piston is in the proper position.

The piston is urged downwardly by the long spring 214' and is urged upwardly by the short spring 214.

The plug valve member 227 is actuated by the screw 226 and it can be moved down and seat in the seat 228 as controlled by the operator.

The start button 233 is threadably received in the body 210 and it can be screwed downward to increase the force on spring 214' and thereby move the piston downward to align the port 216 with the channel 231.

The start button 233 could be provided with a pin 235 attached to the inside thereof which can be tightened to engage the upper end of the piston 213 to force it to the position with port 216 in line with channel 231 at the will of the operator.

It will be seen that the embodiment of the invention shown in FIGS. 3 and 4 provides a structure for increasing the sensitivity of the valve according to the invention wherein the gate valve is provided in the one leg. If the gate valve is placed in the leg as shown and the gate valve is partly closed, the frictional resistance to fluid flow in that leg would be different than the frictional resistance to fluid flow in the other leg. Therefore, the amount of force when fluid or the like is flowing through the valve in one leg would again be changed by the differential of pressure and the phenominal sensitivity of a Wheatstone bridge will be accomplished.

This valve may be used for a blowoff valve, relief valve, and other valves could be designed utilizing the hydraulic valve utilizing the principle of the Wheatstone bridge.

It is obvious that the two ends of the piston can be the same diameter in the embodiment shown and the control be selected by selecting spring valves.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A valve comprising a body having a passage for fluid to flow therethrough from an inlet to an outlet,
said body including an auxiliary channel,
said passage comprising a first channel and a second channel connected in series with said inlet and said outlet,
said first channel comprising
a first flow leg and a second flow leg connected together at a first juncture and connected in series with each other,
and said second channel comprising a third and a fourth flow leg connected together at a second juncture and connected in series with each other,
piston means slidably received in said body and having a first and a second end,
said first end of said piston has an area greater than the second area thereof whereby the total pressure on one end of said piston for a given unit pressure is greater than the total pressure on the other end of said piston for a given value,
said first end of said piston being in fluid flow relation with fluid in said first channel at said first juncture,
said second end being in fluid flow relation with fluid in said second channel at said second juncture, and means on said body to provide a differential between the pressure on said first end of said piston and the pressure on the second end of said piston whereby said piston is moved from a first position to a second position when said differential pressure reaches a predetermined value,
a fluid connection means on said piston connecting said passage to said auxiliary passage when said piston is moved from a first position to a second position.

2. The valve recited in claim 1 wherein means is provided on said valve cylinder to move it initially from a first position to a second position.

3. The valve recited in claim 1 wherein means is provided on said valve to adjust the pressure in one said leg.

4. The valve recited in claim 1 wherein a spring is provided in said valve engaging said piston urging it from said first position to said second position.

5. The valve recited in claim 1 wherein resilient means is provided to urge said piston toward said second position.

References Cited

UNITED STATES PATENTS

| 2,619,103 | 1/1952 | Davies | 251—29 |
| 2,741,262 | 4/1956 | Crookston | 137—529 |
| 2,974,639 | 3/1961 | O'Connor | 91—388 |

FOREIGN PATENTS 35,974  1/1906  Switzerland.

WILLIAM F. O'DEA, *Primary Examiner.*

W. H. WRIGHT, *Assistant Examiner.*

U.S. Cl. X.R.

137—116, 100, 488.